United States Patent [19]

Doll

[11] Patent Number: 5,687,753
[45] Date of Patent: Nov. 18, 1997

[54] FUEL TANK FOR VEHICLES, PARTICULARLY MOTOR VEHICLES

[75] Inventor: Dieter Doll, Magstadt, Germany

[73] Assignee: Dr. Ing. h.c.F. Porsche AG, Weissach, Germany

[21] Appl. No.: 615,600

[22] Filed: Mar. 13, 1996

[30] Foreign Application Priority Data

Mar. 24, 1995 [DE] Germany ............. 195 10 821.3

[51] Int. Cl.$^6$ ........................................... F16K 24/04
[52] U.S. Cl. ..................... 137/43; 55/257.3; 55/441; 137/587
[58] Field of Search ....................... 55/257.3, 441; 96/191; 137/43, 587

[56] References Cited

U.S. PATENT DOCUMENTS

| | | | |
|---|---|---|---|
| 1,773,073 | 8/1930 | Beach | 55/441 |
| 1,838,507 | 12/1931 | Walker | 96/191 |
| 4,666,058 | 5/1987 | Harris | 137/43 X |
| 4,679,581 | 7/1987 | Mears | 137/43 |
| 5,019,141 | 5/1991 | Granville et al. | 137/202 X |
| 5,449,029 | 9/1995 | Harris | 137/202 X |
| 5,568,823 | 10/1996 | Tateishi | 137/43 X |

FOREIGN PATENT DOCUMENTS

3921080A1  3/1991  Germany.

*Primary Examiner*—Gerald A. Michalsky
*Attorney, Agent, or Firm*—Evenson McKeown Edwards & Lenahan PLLC

[57] ABSTRACT

A fuel tank for vehicles, particularly motor vehicles, is provided with an operational ventilating system which is composed essentially of a vent outlet arranged in the area of an upper fuel tank wall, of an exterior air feeding and air removing pipe connected to the vent outlet, and of an activated-carbon filter connected behind. To prevent liquid fuel particles from entering the activated-carbon filter by way of the vent outlet, particularly during lateral accelerations, a device is disposed inside the fuel tank in front of the vent outlet, which device partitions off the vent outlet with respect to a direct action of liquid fuel particles.

24 Claims, 4 Drawing Sheets

FUEL TANK FOR VEHICLES, PARTICULARLY MOTOR VEHICLES

BACKGROUND AND SUMMARY OF THE INVENTION

This invention relates to a fuel tank for vehicles, particularly motor vehicles, having an operational ventilating system which is composed essentially of a vent outlet arranged in the area of an upper fuel tank wall, of an exterior air feeding and air removing pipe connected to the vent outlet and of an activated-carbon filter connected behind.

In the case of a known fuel tank of the initially mentioned type (German Patent Document DE 39 21 080 A), the vent outlet of the operational ventilating system is formed by an opening provided on the upper fuel tank wall, an air removal connection piece being placed on the fuel tank on the exterior side in the area of the opening, to which air removal connection piece an air feeding and air removing pipe is connected which leads to the activated-carbon filter.

In such an arrangement, liquid fuel components (splashing, sloshing) moved particularly during the driving operation by lateral accelerations which are entrained in the area of the vent outlet, arrive in the activated-carbon filter and reduce its working capacity.

It is an object of the invention to take such measures in the area of a vent outlet of the tank-side ventilation device that no liquid fuel particles can enter into the exterior air feeding and air removing pipe as well as the activated-carbon filter, but that gases are carried off without splashing or sloshing.

According to the invention, this object is achieved by providing an arrangement comprising an operational ventilating system which is composed essentially of a vent outlet arranged in an area of an upper fuel tank wall, an exterior air feeding and air removing pipe connected to the vent outlet, an activated-carbon filter disposed downstream of the vent outlet, and a device disposed in front of the vent outlet inside the fuel tank which partitions off the vent outlet with respect to a direct action by liquid fuel particles thrown upwards during the driving operation, wherein the device automatically deflects fuel particles which have entered the device back into the fuel tank interior.

The principal advantages achieved by the invention are that, by means of the arrangement of a device connected in from of the vent cutlet in the fuel tank interior, a direct action of liquid fuel particles (splashing, sloshing) thrown up in the driving operation on the vent outlet is prevented so that by means of the gas flow no liquid fuel particles will enter the exterior air feeding and air removal pipe and the activated-carbon filter connected behind it.

The resulting gases inside the fuel tank interior, however, may be carried away unhindered by means of the device and the ventilating system.

The device is formed by an essentially closed receptacle with an interior hollow space which is connected directly or indirectly to the vent outlet and is surrounded by labyrinth-type ducts.

Preferably, two ducts are provided which surround the interior hollow space. The ducts and the interior hollow space are formed by three upright tube-shaped housing walls which are arranged concentrically with respect to one another and extend at a narrow distance from one another, at least one opening being provided on each housing wall.

Each opening is formed by a longitudinal slot which extends in the vertical direction and, starting on the bottom, extends at least along a significant portion of the overall height of the receptacle.

Two diametrically opposite longitudinal slots are preferably provided on each tube-shaped housing wall. The longitudinal slots of the exterior and interior housing wall are aligned transversely with respect to the longitudinal direction of the vehicle, whereas the longitudinal slots of the center housing wall extend in the longitudinal direction of the vehicle.

By means of the offset longitudinal slots and the relatively narrow ring-shaped ducts, the liquid fuel particles are guided around the vent outlet. The bottom of the receptacle is constructed to be closed. Only an opening of the vent outlet is provided in the roof wall.

The bottom of the receptacle has a conical construction on the side facing the interior hollow space in such a manner that the bottom has an inclination from the center toward the outside. This ensures the automatic emptying or returning of the fuel liquid fuel particles penetrating into the receptacle. In addition, in the interior hollow space of the receptacle, an additional rollover valve may be provided which closes in a corresponding inclined position of the vehicle or in the case of a rollover of the vehicle so that no liquid fuel particles can flow out into the activated-carbon filter or into the open air.

It was found that the combination of the labyrinth-shaped receptacle and the integrated rollover valve results in an excellent operation under all operating conditions.

Other objects, advantages and novel features of the presents invention will become apparent from the following detailed description of the invention when considered in conjunction with the accompanying drawings.

DETAILED DESCRIPTION OF THE DRAWINGS

Figure 1:
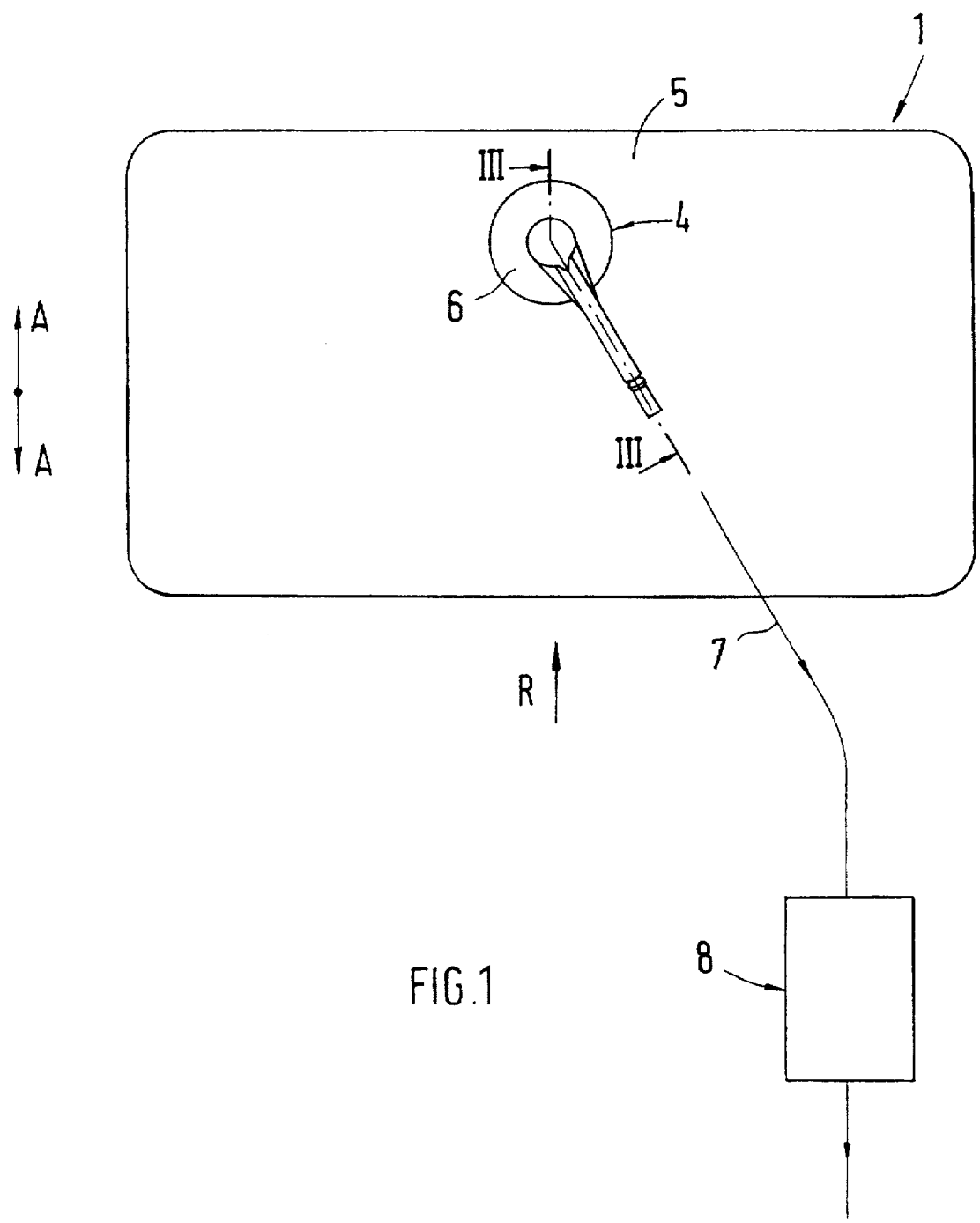
FIG. 1 is a top view of a fuel tank having an operational ventilating system constructed according to a preferred embodiment of the present invention.
Figure 2:
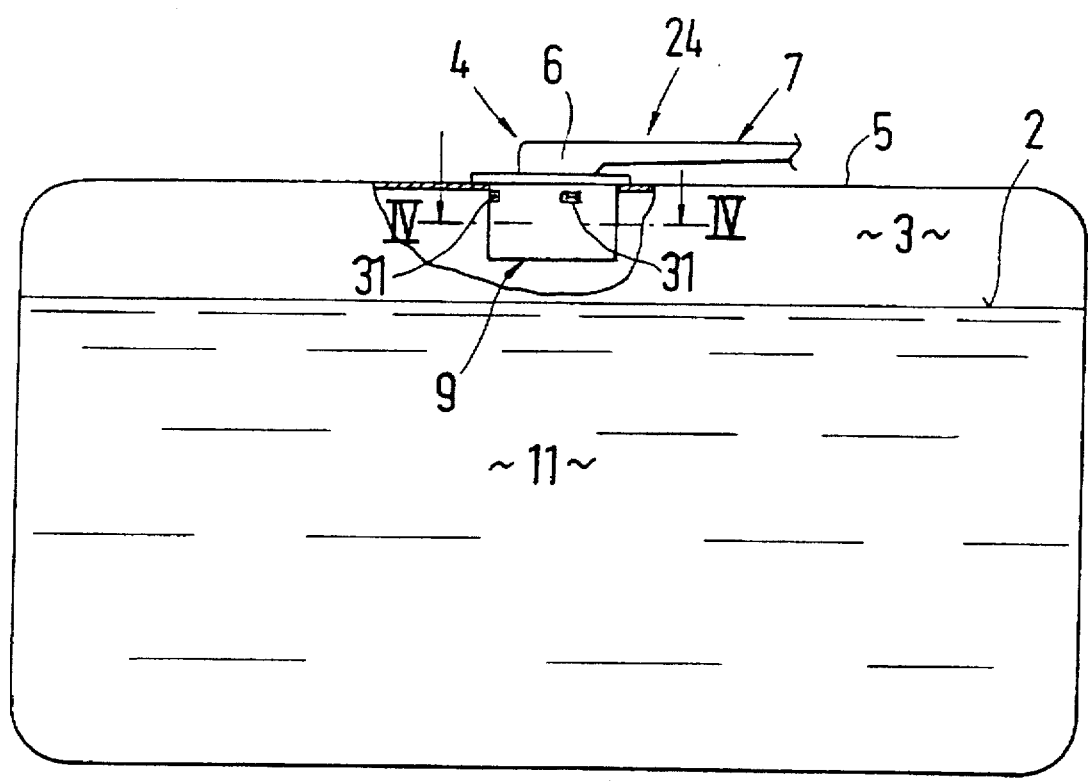
FIG. 2 is a view in the direction of the arrow R of the fuel tank having the operational ventilating system.

FIGS. 1 and 2 show a fuel tank 1 whose highest filling level 2 is limited by a filler neck which is not shown in detail. An expansion space 3 extends above the filling level 2.

An operational ventilating system 4 for the fuel tank 1 is composed essentially of a vent outlet 6 arranged in the area of an upper fuel tank wall 5, of an air feeding and air removing pipe 7 connected to this vent outlet 6, and of an activated-carbon filter 8 connected behind it.

The vent outlet 6 can be formed by a vent nipple or a vent system. However, it may also be integrated into a rollover valve.

According to the invention, a device 9 is disposed in front of the vent outlet 6 inside the fuel tank 1—specifically above the highest filling level 2 in the expansion space 3—which device 9 partitions off the vent outlet 6 with respect to the direct action of liquid fuel particles (swirling, splashing, sloshing) thrown upwards during the driving operation, particularly by means of lateral accelerations. The device 9 is constructed such that the liquid fuel particles which have entered the device 9 will automatically flow back into the fuel tank interior 11.

Figure 3:
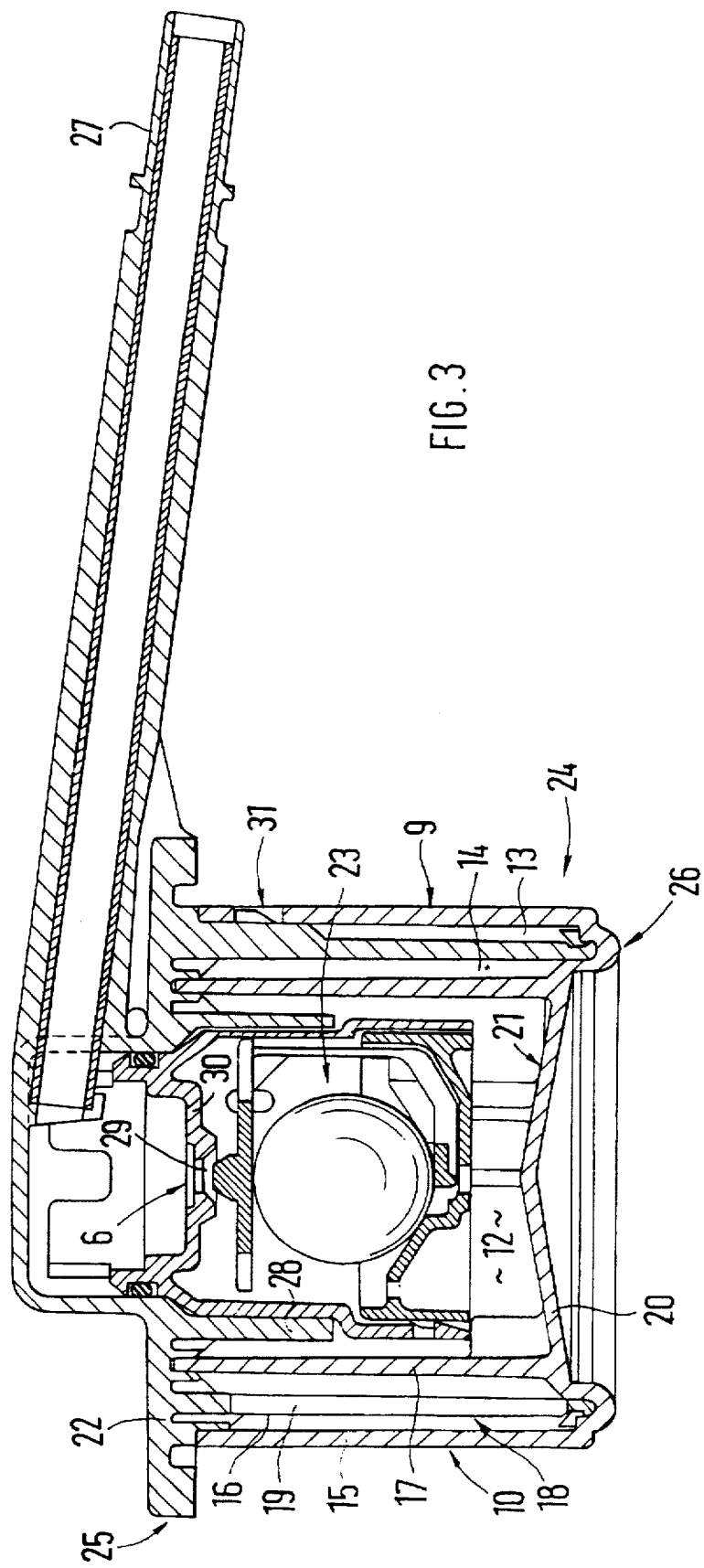
FIG. 3 is an enlarged sectional view taken along line III—III of FIG. 1 and rotated by 90° with the device according to the invention and a rollover valve.
Figure 4:
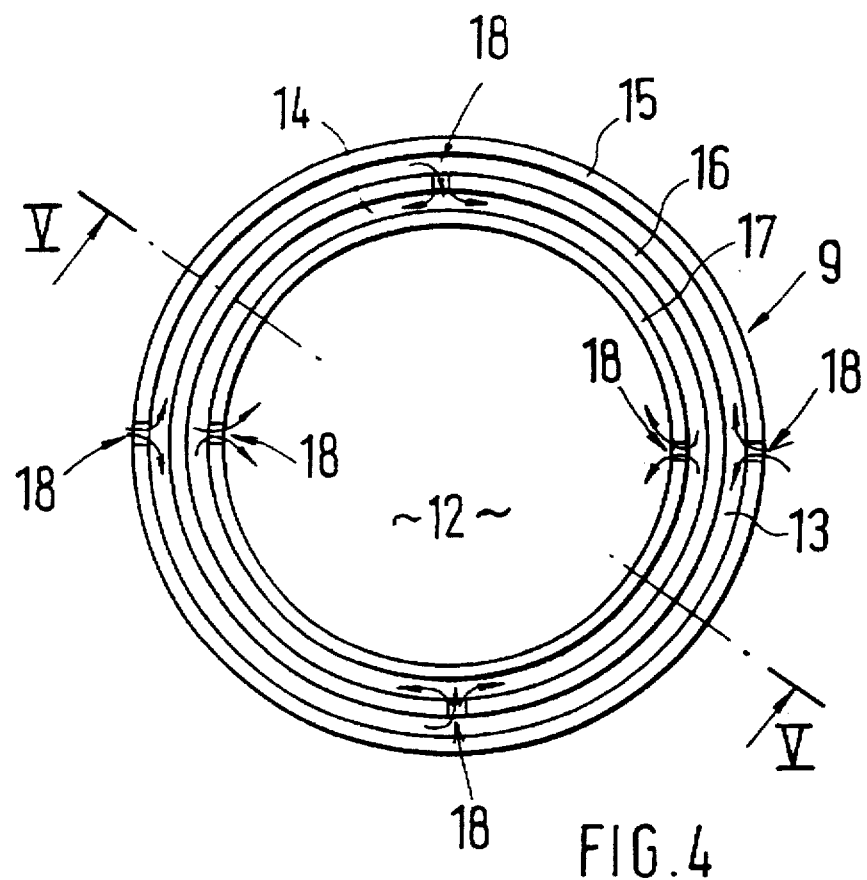
FIG. 4 is an enlarged sectional view taken along Line IV—IV of FIG. 2, only the labyrinth-shaped receptacle of the device being shown.
Figure 5:
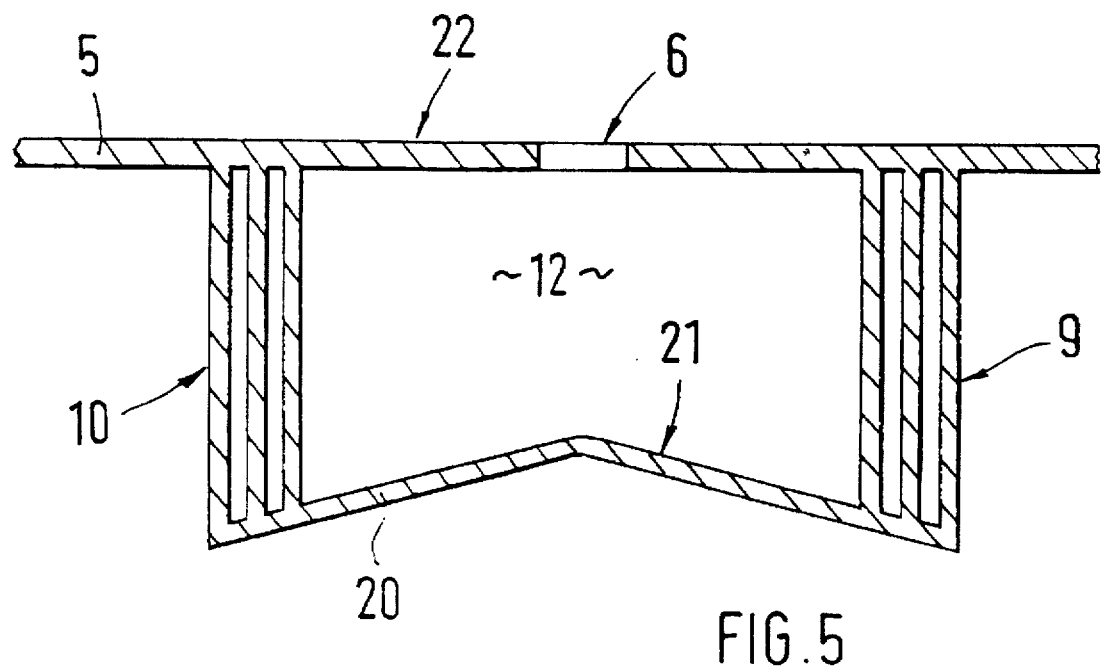
FIG. 5 is a sectional view taken along Line V—V of FIG. 5 of the labyrinth-shaped receptacle without a rollover valve.

According to FIGS. 3 to 5, the device 9 is formed by an essentially closed receptacle 10 which is directly or indirectly connected to the upper fuel tank wall 5 and extends in sections into the fuel tank interior 11—in this case into the expansion space 3.

The receptacle 10 has an interior hollow space 12 which is directly or indirectly connected to the central upper vent outlet 6 and which is surrounded by labyrinth-shaped ducts 13, 14 (FIGS. 3 to 5).

In the embodiment shown, the receptacle 10 comprises an interior hollow space 12 and preferably two surrounding ducts 13, 14 which surround the hollow space 12. However, the number of ducts 13, 14 may also be smaller or larger than in the embodiment shown.

Corresponding to FIG. 4, the ducts 13, 14 and the interior hollow space 12 are formed by three upright tube-shaped housing walls 15, 16, 17 which are arranged concentrically with respect to one another and extend at a narrow distance with respect to one another, at least one opening 18 being provided on each housing wall 15, 16, 17. The tube-shaped or hollow-cylindrical housing walls 15, 16, 17 form ring-shaped ducts 13, 14 between one another.

The housing walls 15, 16, 17 which extend in a surrounding manner with the exception of the openings 18—in the top view may also have an oval, elliptic, square, rectangular or similar construction.

On each tube-shaped housing wall 15, 16, 17, preferably two diametrically opposite openings 18 are provided, in which case the openings 18 of two adjacent housing walls, for example, 15 and 16, 16 and 17, are arranged in an offset manner with respect to one another.

In the embodiment shown, the openings 18 of two adjacent housing walls, for example, 15 and 16, 16 and 17, are arranged to be offset by 90° with respect to one another. The openings 18 of the exterior housing wall 15 and of the interior housing wall 17 are aligned approximately transversely to the longitudinal direction A—A of the vehicle, whereas the openings 18 of the center housing wall 16 situated in-between extend in the longitudinal direction A—A of the vehicle. The openings 18 are formed by narrow longitudinal slots 19 which are aligned in the vertical direction of the vehicle and which, starting approximately at the level of a bottom 20 of the receptacle 10, extend at least along a significant portion of the overall height of the receptacle 10. In the embodiment shown, the longitudinal slots preferably extend along the whole height of the receptacle walls.

The position and size of the openings 18 or their number can be empirically determined or optimized. On the side 21 facing the venting outlet 6 situated above it, the closed bottom 20 of the receptacle 10 has a conical construction such that, from the center to the outside, the bottom 10 is continuously inclined. As a result, it is ensured that the liquid fuel particles penetrating into the device 9 automatically flow back into the fuel tank interior 11.

The roof wall 22 of the receptacle 10 may be formed either by the upper fuel tank wall 5 itself or by a separate wall which is fixedly connected with the upper fuel tank wall 5 (for example, by means of welding, gluing or the like).

It is also contemplated in the preferred embodiment shown that a rollover valve 23 is also arranged in the interior hollow space 12 which is known per se and which is disposed in front of the vent outlet 6.

According to FIG. 3, the receptacle 10, the rollover valve 23 and the vent outlet 6 form a prefabricated component 24. For manufacturing reasons, the component 24 is constructed of several parts and comprises an upper housing part 25, a lower housing part 26 and the inserted multi-part rollover valve 23.

The lower housing part 26 comprises the oblique bottom 20 as well as the exterior and interior housing wall 15, 17, while the upper housing part 25 comprises a roof wall 22, the center housing wall 16, an exterior connection piece 27 for the exterior air feeding and air removing pipes 7 and an interior cylindrical receiving device 28 for the inserted rollover valve 23.

An outlet opening 29 of the vent outlet 6 in this embodiment is formed on an upper wall 30 of the rollover valve 23. The upper and the lower housing part 25, 26 are fitted into one another and are fixedly connected with one another by detachable elastic detent elements 31.

The component 24 is fixedly connected with the upper fuel tank wall 5, in which case the receptacle 10 projects with the labyrinth-shaped ducts 13, 14 into the fuel tank interior 11 or the expansion space 3, while a connection piece 27 of the vent outlet 6 extends outside the fuel tank 1.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Fuel tank system for vehicles, particularly motor vehicles, comprising:

an operational ventilating system which is composed essentially of a vent outlet arranged in an area of an upper fuel tank wall, an exterior air feeding and air removing pipe connected to the vent outlet, and a partitioning device disposed in front of the vent outlet inside the fuel tank which partitions off the vent outlet with respect to a direct action by liquid fuel particles thrown upwards during the driving operation, wherein said partitioning device is a receptacle with a plurality of walls spaced from one another and having offset openings thereby forming a labyrinth path from the fuel tank to the vent outlet, and wherein said receptacle includes a bottom which slopes downwardly to bottom portions of at least one of said offset openings thereby facilitating flow of any liquid fuel in said receptacle back to the fuel tank.

2. Fuel tank system according to claim 1, wherein the walls include three upright, tube-shaped housing walls which are arranged concentrically with respect to one another and extend at a narrow distance from one another, at least one of said offset openings being provided on each surrounding housing wall.

3. Fuel tank system according to claim 2, wherein two diametrically opposite openings are provided on each tube-shaped housing wall, said openings being in two adjacent housing walls and arranged in an offset manner with respect to one another.

4. Fuel tank according system to claim 3, wherein said housing walls include an exterior housing wall, an interior housing wall, and a center housing wall, and wherein the openings of the exterior and interior housing walls are aligned approximately transversely with respect to the longitudinal direction of the vehicle, whereas the openings of the center housing wall extend in the longitudinal direction of the vehicle.

5. Fuel tank system according to claim 4, wherein the openings are formed by narrow longitudinal slots on the housing walls extending in a vertical direction of the vehicle, the longitudinal slots extending at least along an essential portion of the overall height of the receptacle.

6. Fuel tank system according to claim 4, further comprising an activated carbon filter disposed downstream of the vent outlet.

7. Fuel tank system according to claim 2, wherein the bottom of the receptacle is a closed bottom which has a conical construction on the side facing the vent outlet, the bottom sloping downward on the interior side from the center toward the outside.

8. Fuel tank system according to claim 7, further comprising a rollover valve arranged in an interior hollow space of the receptacle and disposed in front of the vent outlet.

9. Fuel tank system according to claim 8, wherein the receptacle, the rollover valve and the vent outlet form a prefabricated component.

10. Fuel tank system according to claim 9, wherein the component is fixedly connected with an upper fuel tank wall, the receptacle projecting with the labyrinth-shaped ducts into the fuel tank interior while a connection piece of the vent outlet extends outside the fuel tank.

11. Fuel tank system according to claim 2, further comprising an activated carbon filter disposed downstream of the vent outlet.

12. Fuel tank system according to claim 1, wherein the bottom of the receptacle is a closed bottom which has a conical construction on the side facing the vent outlet, the bottom sloping downward on the interior side from the center toward the outside.

13. Fuel tank system according to claim 1, further comprising a rollover valve arranged in an interior hollow space of the receptacle and disposed in front of the vent outlet.

14. Fuel tank system according to claim 13, wherein the receptacle, the rollover valve and the vent outlet form a prefabricated component.

15. Fuel tank system according to claim 14, wherein the component is constructed in several parts.

16. Fuel tank system according to claim 1, wherein said plurality of walls extend concentrically with respect to one another.

17. Fuel tank system according to claim 16, wherein said bottom is conical in shape with a center at its highest point disposed centrally of a radially innermost of said walls.

18. Fuel tank system according to claim 17, wherein said offset openings are configured as respective slots in said walls which extend upwardly from the bottom.

19. Fuel tank system according to claim 18, further comprising a rollover valve arranged in an interior hollow space of the receptacle and disposed in front of the vent outlet.

20. Fuel tank system according to claim 19 wherein the receptacle, the rollover valve and the vent outlet form a prefabricated component.

21. Fuel tank system according to claim 20, further comprising an activated carbon filter disposed downstream of the vent outlet.

22. Fuel tank system according to claim 18, further comprising an activated carbon filter disposed downstream of the vent outlet.

23. Fuel tank system according to claim 16, wherein a total of three of said walls are provided.

24. Fuel tank system according to claim 1, further comprising an activated carbon filter disposed downstream of the vent outlet.

* * * * *